United States Patent [19]

Imai et al.

[11] Patent Number: 4,864,351

[45] Date of Patent: Sep. 5, 1989

[54] A METHOD AND APPARATUS FOR CLEANING A DEVELOPING ELECTRODE OF AN ELECTROPHOTOGRAPHIC DEVICE

[75] Inventors: Masaru Imai; Shuichi Ohtsuka; Izumi Watanabe, all of Kanagawa, Japan

[73] Assignee: Fuji Photo Film Co., Ltd., Kanagawa, Japan

[21] Appl. No.: 105,789

[22] Filed: Oct. 8, 1987

[30] Foreign Application Priority Data

Oct. 8, 1986 [JP] Japan ................................ 61-239806
Jan. 14, 1987 [JP] Japan ................................ 62-007312

[51] Int. Cl.[4] ........................ G03G 15/00; G11B 5/10; G11B 5/41

[52] U.S. Cl. .................................... 355/245; 355/264; 15/DIG. 12; 360/128

[58] Field of Search ............. 15/256.5, 256.52, 250.24, 15/3.53, 429, 431, 433, DIG. 12, DIG. 13; 360/128, 118; 355/15, 3 R, 16, 64

[56] References Cited

U.S. PATENT DOCUMENTS 4,408,241 10/1983 Ogawa ................................ 360/128
4,462,056 7/1984 Kara .................................... 360/128
4,616,283 10/1986 Clausen et al. ..................... 360/128
4,661,874 4/1987 Buehl et al. .......................... 360/128
4,674,000 6/1987 Lee ...................................... 360/128
4,685,638 8/1987 Satoyoshi et al. ........... 355/3 BE X

*Primary Examiner*—A. C. Prescott
*Attorney, Agent, or Firm*—Sughrue, Mion, Zinn, Macpeak & Seas

[57] ABSTRACT

A cleaning method for removing unnecessary matter accumulated on a surface on the bottom of a recess so as to clean the surface. An adhesive surface on a projection projected from an elongated base member is brought into contact with the unnecessary matter on the surface to be cleaned and is separated forcibly from the surface to be cleaned by application of tension to the elongated base member, whereby the unnecessary matter is lifted off the recessed surface to be cleaned. Disclosed also is a cleaning cassette for cleaning the bottom surface of a recess by removing unnecessary matter from the surface, having an elongated tape-like base member carrying a plurality of projections each having an adhesive end surface which is adapted to be pressed onto the unnecessary matter accumulated on the surface to be cleaned.

20 Claims, 11 Drawing Sheets

222
222A
223
223A
223B
224
225
226
227
228
229
230
232
FR
LA
LB
LC
LD
W
C

A METHOD AND APPARATUS FOR CLEANING A DEVELOPING ELECTRODE OF AN ELECTROPHOTOGRAPHIC DEVICE

BACKGROUND OF THE INVENTION

1. Field of the Invention

The present invention relates to a cleaning method and a cleaning cassette suitable for use in cleaning a developing electrode of an electrophotographic apparatus.

2. Description of the Prior Art

An electrophotographic apparatus has been known in which images are recorded in selected frames on an electrophotographic film and the images thus recorded are projected and/or copied as desired. Also known is a cassette having a case accommodating a roll of an electrophotographic film in the form of a tape. One example of the aforesaid cassette is disclosed in U.S. Pat. Nos. 4,572,649 and 4,685,638. This type of film is suitable for use in recording and retrieving a large amount of documents, and offers various advantages which could never be attained by conventional films made of a silver halide material. The recording of images on this type of film is effected through a series of operations including charging/exposure and development performed by a process head a typical example of which is disclosed in U.S. Pat. Nos. 4,591,543, 4,600,291, 4,622,915, 4,623,240, 4,624,554 and so on.

More specifically, the process head is equipped with a charring/exposure section, a developing section, a drying section and a fixing section, and the electrophotographic film is made to pass through these sections successively. In the developing section, the image is developed by application of a sufficient amount of developer over the entire area of the exposed region under application of a bias voltage to a developing electrode provided in the developing section, whereby a clear visible image is obtained.

A problem is encountered in this connection in that solid contents of the developer are accumulated partly because of an electrostatic force which acts to attract the solid contents onto the developing electrode and partly because of the drying of the developer remaining on the electrode. The accumulation of the solid contents on the electrode, when it has become heavy, seriously deteriorates the bias effect of the developing electrode and impairs the passage of the developer. In order to obviate this problem, it is necessary to periodically clean the developing electrode so as to get rid of solid matter attaching thereto. Such a cleaning work, however, is not easy because the developing electrode is recessed from the surface of the process head.

SUMMARY OF THE INVENTION

Accordingly, an object of the present invention is to provide a cleaning method and a cleaning cassette which are capable of easily removing unnecessary solid matter accumulated on or attaching to recessed portions of various devices, typically solid contents of a developer attaching to a developing electrode disposed in the developing section of a process head of an electrophotographic apparatus.

To this end, according to one aspect of the present invention, there is provided a cleaning method for removing, by adhesion, unnecessary solid matter accumulating on the surface of the object to be cleaned on the bottom of a recess thereby cleaning the surface of the object to be cleaned, comprising the steps of: (a) bringing an adhesive surface on the end of a projection projecting from the surface of an elongated base member into contact with the matter to be removed on the surface to be cleaned; and (b) applying a tension to the base member so as to forcibly separate the adhesive surface from the surface to be cleaned with the unnecessary matter adhering to the adhesive surface, thereby removing the unnecessary matter from the surface to be cleaned.

According to the invention, the projection which projects from the elongated base member can press the adhesive member onto the bottom of the recess, so that the matter accumulated on the bottom of the recess can be removed without fail. When the adhesive surface opposes one of two corners of the recess, the tension is applied to the elongated base member in such a direction as to move the adhesive surface away from the other corner, thus ensuring removal of the unnecessary matter from the region of the surface to be cleaned around the first-mentioned corner. Namely, the adhesive surface exhibits, when the elongated base member is pulled, such a tendency that a greater pressing force is produced between the adhesive surface and the surface to be cleaned in the region near the leading end of the adhesive surface as viewed in the direction of the pull of the elongated base member than in the region near the opposite end of the adhesive surface. Therefore, when the adhesive surface is positioned on the region of the surface to be cleaned near one of two corners of the recess, matters accumulated on this region of the surface to be cleaned can be removed without fail as the elongated base member is pulled in such a direction as to move the adhesive surface away from the other of two corners of the recess. When the adhesive surface is positioned near the above-mentioned other corner of the recess, the matter accumulated on the region around this corner can be removed without fail as the elongated base member is pulled in such a direction as to move the adhesive surface away from the above-mentioned first corner of the recess, whereby the unnecessary matter on both corner portions of the recess can be removed satisfactorily.

Preferably, the projection length of the projection from the base member is selected to be 1.1 or more times that of the depth of the recess to be cleaned and the projection is made from an elastic material so that any tolerance or dimensional error can be absorbed so as to ensure a high cleaning effect.

According to another aspect of the present invention, there is provided a cleaning cassette for removing, by adhesion, unnecessary matter accumulating on the surface of an object to be cleaned on the bottom of a recess thereby cleaning the surface of the object, comprising: a cassette case; a pair of reels rotatably mounted in the cassette case; a tape-type elongated base member having both ends retained by the reels; and at least one projection projecting from a surface of the elongated base member and having an adhesive end surface.

This cleaning cassette is mounted in the same manner as the mounting of ordinary audio or video recording cassettes, so that the projection is placed in the recess to be cleaned, so that the adhesive surface is brought into contact with the matter to be removed such as solidified developer, thus ensuring complete removal of such matters.

It is also preferred in this case that the projection length of the projection from the base member is selected to be 1.1 or more times that of the depth of the recess to be cleaned and that the projection is made from an elastic material, so that any tolerance or dimensional error can be absorbed so as to ensure a high cleaning effect.

These and other objects, features and advantages of the present invention will become clear from the following description of the preferred embodiments when the same is read in conjunction with the accompanying drawings.

BRIEF DESCRIPTION OF THE DRAWINGS

FIG. 6 is a perspective view of a cassette holder in an open state;

DESCRIPTION OF THE PREFERRED EMBODIMENT

Figure 7:
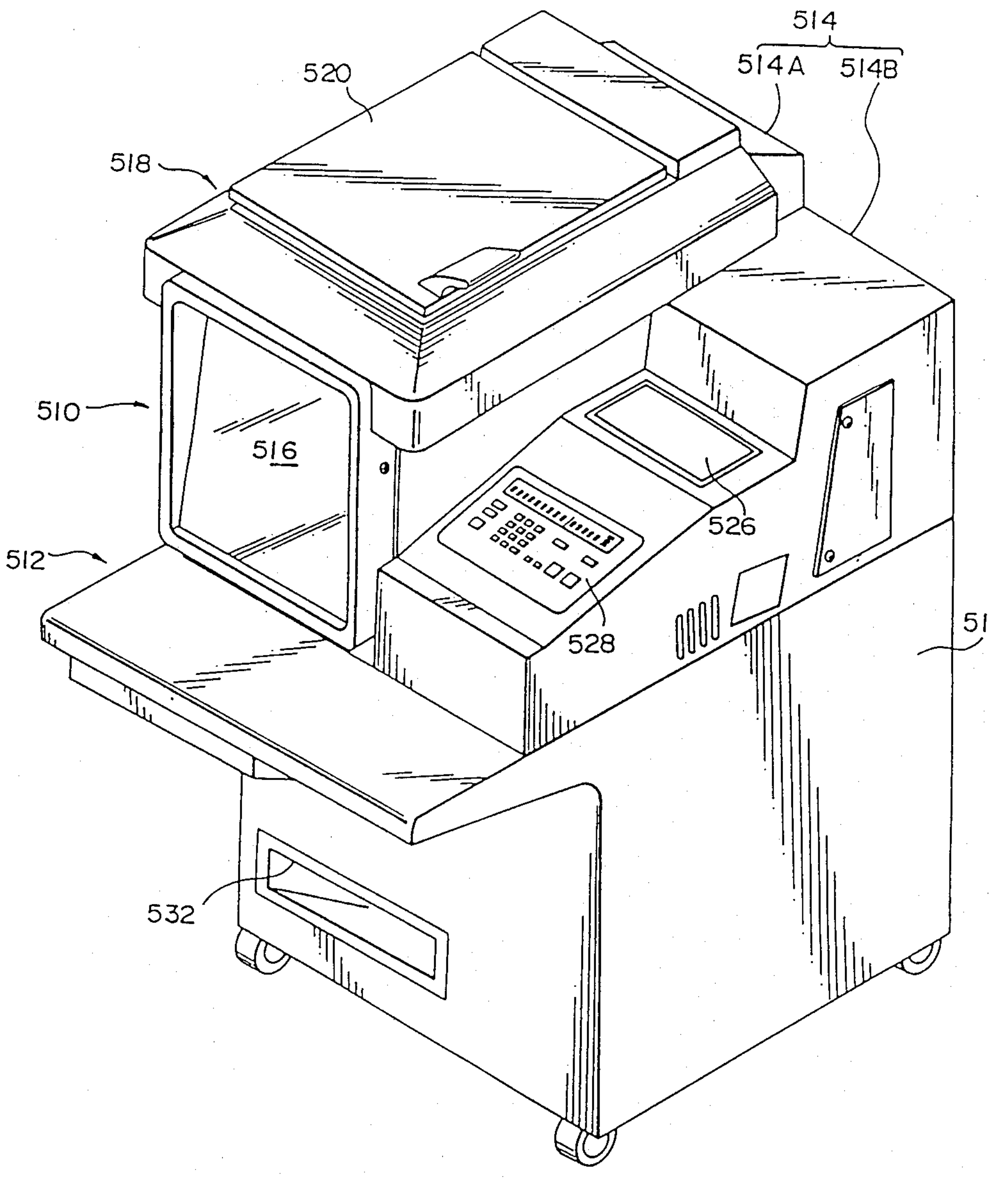
FIG. 7 is a perspective view of the body of an electrophotographic apparatus.

FIG. 7 shows an electrophotographic apparatus to which the present invention is applied. The electrophotographic apparatus has various functions: namely, a camera function which enables the image of a document to be recorded on an electrophotographic film; a reader function which enables the image recorded on the film to be enlarged and projected on a screen; and a copy function which enables the image recorded on the film to be enlarged and copied on a sheet of copying paper.

The electrophotographic apparatus has on integral structure which consists of an electrophotographic apparatus body 510, a housing 511, and a copying machine 512 serving also as a table for mounting the body 510. When the copy function is not needed, the electrophotographic apparatus body 510 may be used alone. The apparatus body 10 includes a housing 514 which consists of a left-hand portion 514A having a substantially rectangular parallelopiped configuration nd a right-hand portion 14B which has a stepped upper surface. The respective internal spaces of these portions 514A and 514B are communicated with each other at the side thereof which is closer to the rear end of the apparatus.

A rear projection screen 516 is disposed in the housing portion 514A in such a manner that the screen 516 closes an opening provided in the front side of the housing portion 514A and it is slightly slanted rearwardly. A document table 518 is disposed on the upper side of the housing portion 514A. The document table 518 includes a document pressing plate 520 which can be opened and closed as desired, and a transparent glass plate which is disposed underneath the plate 520 in such a manner as to close an opening provided in the upper side of the housing portion 14A. A cassette loading section 526 for loading a cassette (not shown) accommodating an electrophotographic microfilm 222A (see FIG. 1D) or a cleaning cassette 525 accommodating a cleaning tape 222 (see FIG. 1A) is provided in the central portion of the upper side of the housing portion 14B. A control keyboard 528 through which various controls of the electrophotographic apparatus are effected is disposed on the front portion of the upper side of the housing.

The housing 511 of the copying machine 512 is provided with an opening 532 for delivering a copied sheet of paper.

The recording of an image on the electrophotographic film 222A is conducted by mounting the image recording cassette on the cassette mounting section 526 such that a desired frame of the electrophotographic film 222A is placed in a process head (see FIGS. 8 to 10), and then subjecting the frame to charging/exposure, development, drying and fixing by moving the film 222A in the process head 554. The arrangement is such that an original having the image to be recorded is placed o the document mounting table 518 and is illuminated by a light source (not shown) so that the light from the original image is led through an internal optical system so as to be applied to the electrophotographic film 222A, thereby exposing the latter.

The internal optical system is switchable such that the image formed on the electrophotographic film is projected on the screen 516 or such that the image is reproduced in the form of a hard copy by the copying machine.

Figure 8:
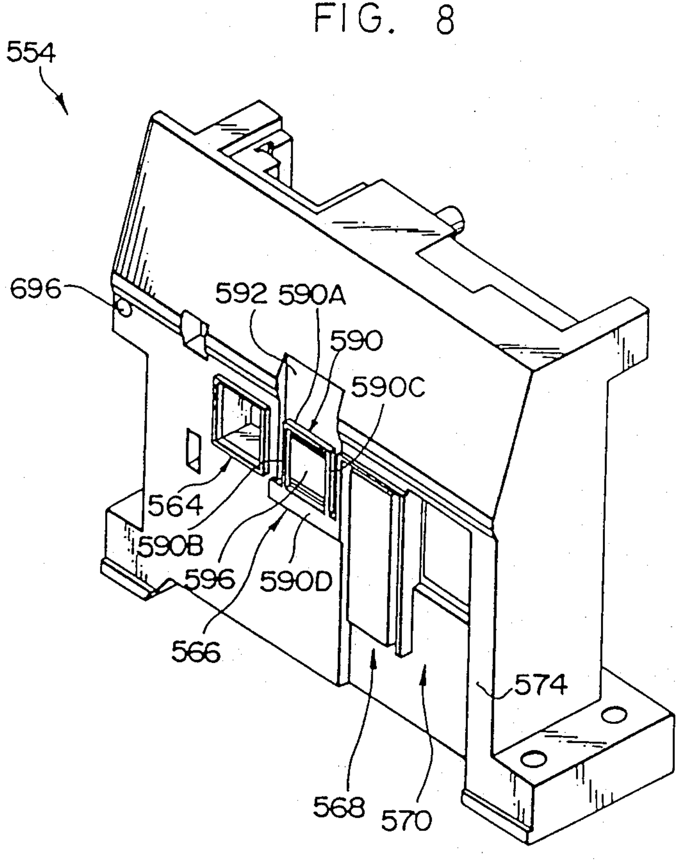
FIG. 8 is a perspective view of a process head.
Figure 9:
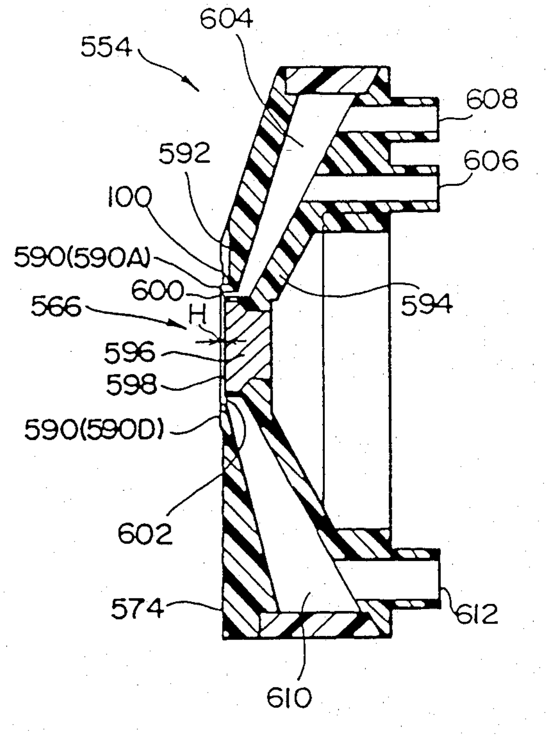
FIG. 9 is a longitudinal sectional view of a developing section in the process head.
Figure 10:
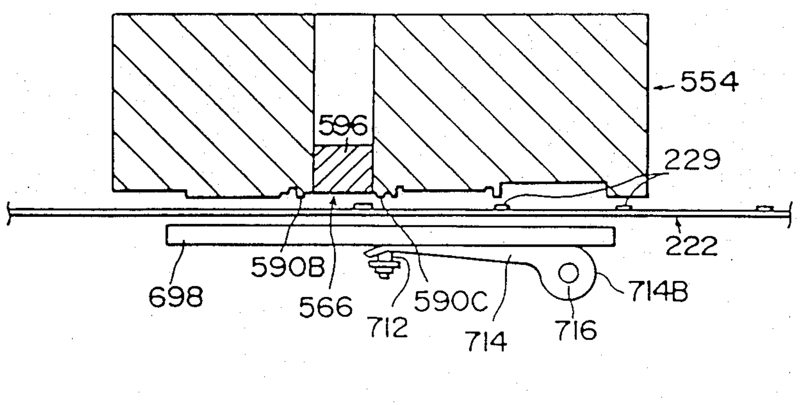
FIG. 10 is a horizontal sectional view of the process head showing particularly the developing section.

As shown in FIGS. 8 to 10, the process head 554 has a charging/exposure section 564, a developing section 566, a drying section 568 and a fixing section 570 through which successive frames on the electrophotographic film 222A are passed so as to be processed.

The developing section 566 has a mask 590 having an upper frame member 590A, a left frame member 590B, a right frame member 590C and a lower frame member 590D all of which protrude from the surface of a recess 592 formed in a front wall 574.

As will be seen from FIG. 9, the opening of the mask 590 receives a developing electrode 596 supported by a rear wall 594 and connected to a biasing power supply. The surface of the developing electrode 596 is offset slightly inwardly from the end surface of the mask 590. The amount of the offset is on the order of 0.3 to 1.0 mm. The space defined by the developing electrode 596 and the inner wall surfaces of the mask 590 constitutes a developing chamber 598. The developing electrode 596 is slit at an upper portion and a lower portion thereof thereby providing an inlet 600 and an outlet 602 for the developer and squeezing air.

The developer/squeezing air inlet 600 is communicated with a passage 604 which is constituted by the internal space of the process head 554. The passage 604 in turn communicates with a developer supply port 606 and a squeezing air supply port 608 which are formed behind the process head 554. The developer supply port 606 is connected to a developer tank through a valve which is not shown, while the squeezing air supply port 608 is connected to an air pump. The developer/squeezing air outlet 602 is communicated with the passage 610 constituted by the internal space of the process head 554. The passage 610 communicates with a developer/-squeezing air outlet port 612 formed in the rear wall of the process head 554, through which surplus developer is returned to the developer bottle.

Figure 11:
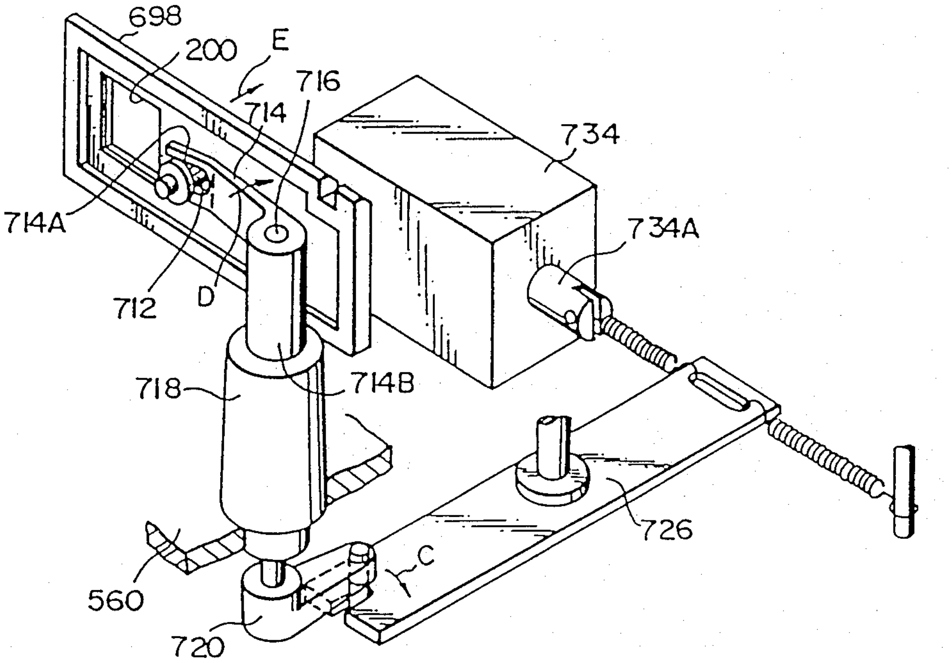
FIG. 11 is a perspective view showing a pressing plate and its associated parts.
Figure 12:
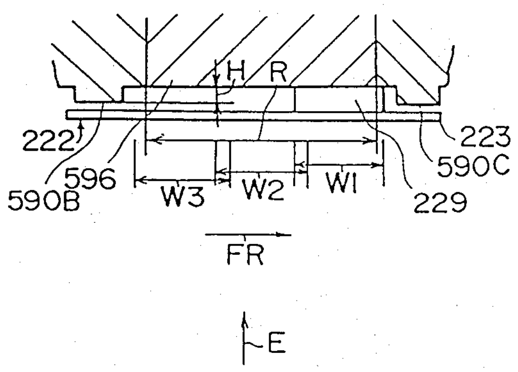
FIG. 12 is an enlarged horizontal sectional view showing a developing electrode contacted by an adhesive tape, with the pressing plate being omitted.

As shown in FIGS. 11 and 12, a film pressing plate 698 is disposed such as to oppose the front wall 574 of the process head 554. A columnar portion 712 is formed on the reverse side of the pressing plate opposite to the process head 554. A notched portion 714A formed on one end of the arm 714 engages with the columnar portion 712. A boss portion 714B is formed on the other end of the arm 714. A shaft 716 is fixed to the boss portion 714B.

The shaft 716 is rotatably supported in holes formed in a stand 718 which protrudes from a frame 560 to which the process head 554 is secured. The lower end of the shaft 716 projects downward beyond the reverse side of the frame 560. The projected end of the shaft 716 is connected through a first lever 720 and a second lever 726 to the plunger 734A of a solenoid 734. The arrangement is such that, when the solenoid 734 is excited, the pressing plate 698 is pressed onto the mask 590 of the process head 554, as indicated by an arrow E in FIG. 11.

A blip sensor 696 secured to the front wall 574 of the process head 554 is adapted to photoelectrically detect, on the basis of difference in reflectivity, blip marks (not shown) provided on the respective frames of the electrophotographic film 222A, thereby enabling the apparatus to stop the electrophotographic film such that the successive frames are set at successive stations.

FIGS. 1 to 6 show a cleaning cassette 525 of the invention which is suitable for use in the electrophotographic apparatus of the type explained above. The cleaning cassette 525 accommodates a cleaning tape 222 for cleaning the developing section of the process head incorporated in the electrophotographic apparatus. The construction of the cleaning cassette 525 is substantially the same as the video recording cassette accommodating the electrophotographic film 222A (see FIG. 1D), except for some portions. Each of the constituent parts of the cleaning cassette will be explained hereinunder.

As shown in FIG. 1, the cleaning cassette 525 has a lower cassette case generally designated by 10 constituted by a substantially U-shaped planar shape with left and right ends projected forwardly and a peripheral wall protruding upright from the peripheral edge of the bottom plate 12. More specifically, the peripheral wall includes a rear wall 14 extending along the rear edge of the bottom plate 12, left and right side walls 16 and 18 protruding from the left and right edges of the bottom plate 12, and a front wall 20 formed along the front edge of the bottom plate 12 so as to extend between intermediate portions of the left and right edges of the bottom plate 12. The rear wall 14 and the left and right side walls 16, 18 are integral with one another and are formed along the outermost portion of the bottom plate 12.

The portion 20A of the front wall 20 disposed inside the left side wall 16 extends rearward in parallel with the left side wall 16 and is then curved inward so as to merge in the rear wall 14. The portion 20B of the front wall inside the right side wall 18 extends rearward in parallel with the latter leaving a small gap left therebetween and is then curved outward so as to merge in the right side wall 18. The bottom plate 12 of the lower cassette case 10 has partition walls, pillars, cylindrical projections, recesses and protrusions. The described parts of the lower cassette case 10 is formed integrally from a synthetic resin. Partitions formed on the bottom plate 12 define the following chambers: a pair of reel chambers 30, 32 for receiving a pair of reels; a pair of guide roller chambers 34, 36 for receiving a pair of guide rollers; a brake mechanism chamber 38 for receiving a brake mechanism for braking the reels; a lock plate chamber 40 for receiving a lock plate to which a guard panel is fixed; and an isolated chamber 42 in which is disposed a claw member.

The pair of reel chambers 30 and 32 are disposed on the left and right sides of a central partition 44 which stands upright from the bottom plate 12 at a position which is slightly offset to the right from the longitudinal mid portion of the lower cassette case 10. Circular through holes 46, 46 are formed in the portions of the bottom plate 12 within the left and right reel chambers 30 and 32. An annular protrusion 48, having a rectangular cross-section, is formed on the inner surface of the bottom plate 12 such as to surround each through-hole 46. The bottom plate 12 also has an annular protrusion having a rectangular cross-section and surrounding each annular protrusion 48 such as to concentrically surround the annular protrusion 48. Thus, an annular recess 51 is formed between both annular protrusions 48 and 50 in each of the reel chambers 30 and 32. The annular recess 51 is slightly recessed from the plane of the surface of the bottom plate 12.

The guide roller chambers 34 and 36 are disposed in the vicinity of the respective guide rollers 34 and 36, within the forward projections on the left and right ends of the lower cassette case 10. The guide roller chambers 34 and 36 have cylindrical bosses 52 and 52 which project from the bottom plate 12 upward to the same height as the peripheral wall of the lower cassette case 10. These cylindrical bosses constitute support members for rotatably supporting tape guide reels 236.

Partition walls 54, 54 separating the left and right guide roller chambers 34, 36 from the left and right reel chambers 30 and 32 are partially cut-away. Portions of the front wall 20 facing the left and right guide roller chambers 34 and 36 also are notched as at 58 and 58 so as to provide passageways for a cleaning tape 222.

The brake mechanism chamber 38 is disposed at the central rear portion of the lower cassette case 10, in the vicinity of the lower cassette case 10. The brake mechanism chamber 38 is sectioned into three sub-chambers by means of a pair of partition walls 60, 60 parallel to the central partition wall 44. These three sub-chambers are: a central release piece chamber 62 and brake-lever chambers 64, 64 on both sides of the release piece chamber 62.

The isolated chamber 42 is defined on the rear side of the lock plate chamber 40. Cylindrical projections 98, 98 and 98 project upward from the inner surface of the bottom plate 12 to the same height as the peripheral wall of the lower cassette case 10, at three portions: namely, left rear portion, right rear portion and central front portion. These cylindrical projections 98, 98 and 98 have threaded holes in which bolts are screwed so as to connect the lower cassette case 10 to an upper cassette case 104 which will be mentioned later.

Figure 3:
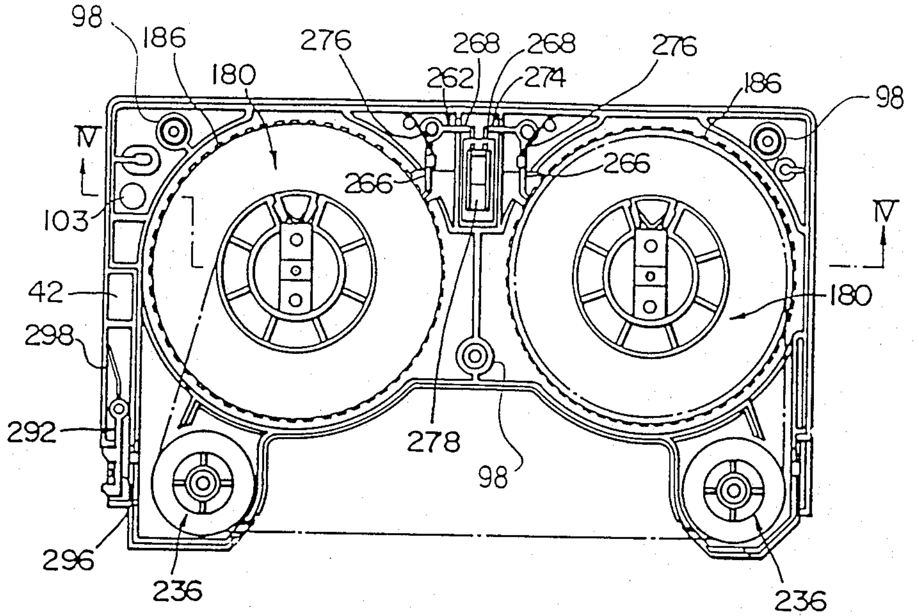
FIG. 3 is a plan view showing the state in which various parts are assembled in a lower cassette case.
Figure 4:
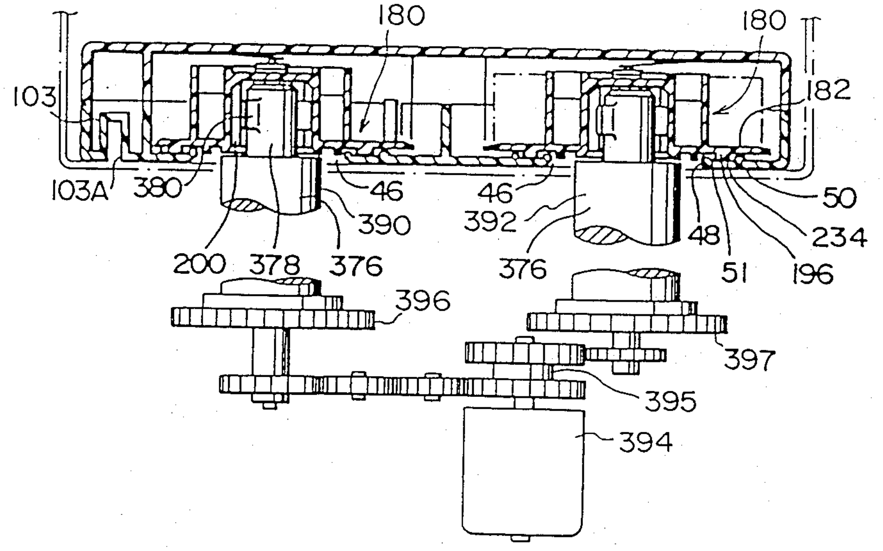
FIG. 4 is a sectional view taken along the line IV—IV of FIG. 3.

As will be seen from left upper portion of FIG. 3 and also from left portion of FIG. 4, a cylindrical projection 103 closed at its top is formed on a portion of the bottom plate 12. The lower end of the cylindrical projection 103 is opened to the lower side of the lower cassette case 10 so as to constitute a cleaning cassette detection hole 103A. The video recording cassette mentioned before is devoid of this cleaning cassette detection hole 103A. It is therefore possible to discriminate whether the mounted cassette is the cleaning cassette or a video recording cassette, through detection of the cleaning cassette detection hole 103A.

Referring back to FIG. 1, the cleaning cassette 525 also has an upper cassette case denoted by 104. The upper cassette case 104 has a top plate 106 having a rectangular main portion 106A and left and right end portions 106B, 106C slightly projected forwardly and a peripheral wall depending from the peripheral edge of the top plate 106. The peripheral wall has major portions conforming and contactable with major portions of the peripheral wall of the lower cassette case, such as the rear wall 14, left and right side walls 16, 18 and the front wall 20.

Partition walls conforming with the partition walls on the lower cassette case 10 are formed also in the upper cassette case so as to define the aforementioned chambers. Cylindrical bosses (not shown) are formed so as to project from the inner surface of the top wall 106 substantially to the same level as the peripheral wall. These cylindrical bosses are so positioned that they are vertically aligned with the cylindrical bosses 52, 52 on the lower cassette case 10 within the left and right guide roller chambers 34, 36, when the upper and lower cassette cases 104 and 10 are jointed to each other. As is the case of the lower cassette case 10, the upper cassette case 104 is formed integrally from a synthetic resin.

Figure 1A:
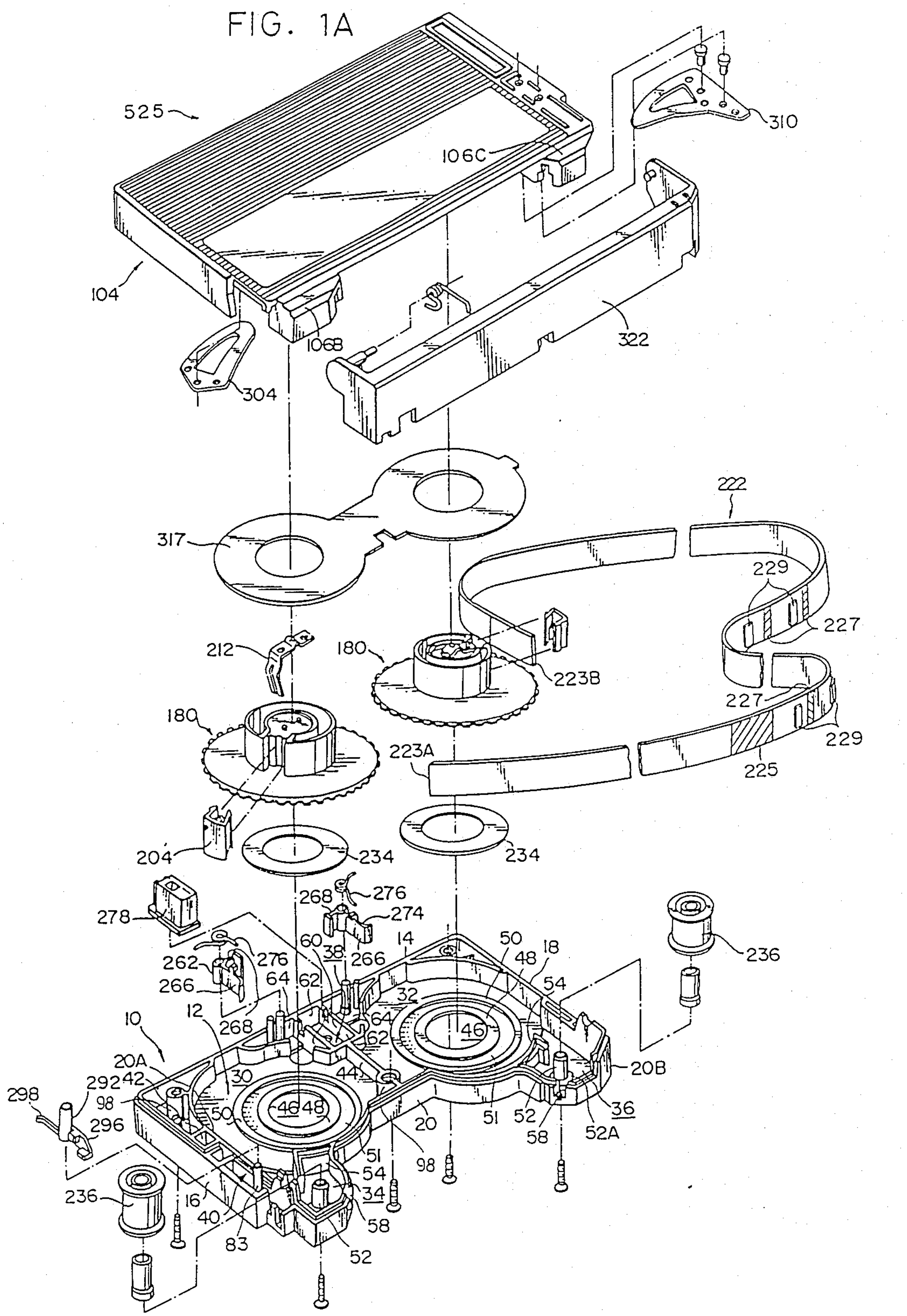
FIG. 1A is an exploded perspective view of a cleaning cassette embodying the present invention.
Figure 2A:
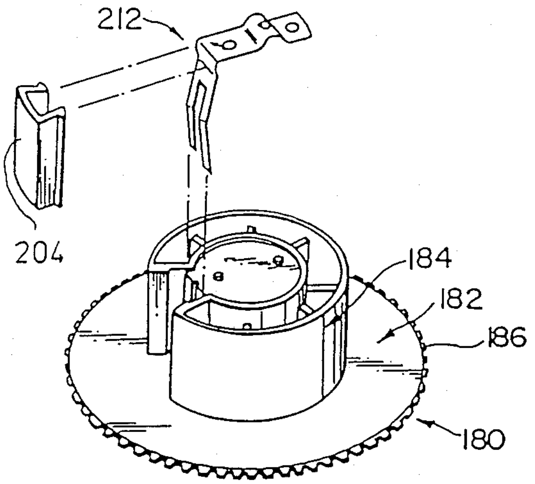
FIG. 2A is an exploded perspective view of a reel.
Figure 2B:
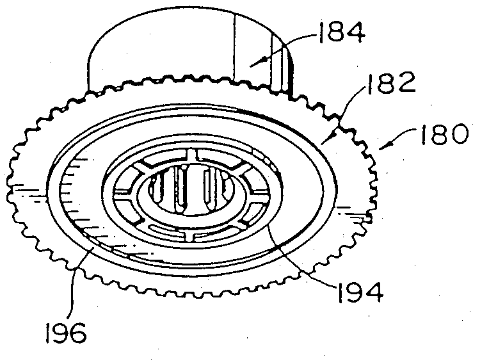
FIG. 2B is a perspective view of the reel as viewed from the lower side of the reel.

As will be seen from FIGS. 1A and 2, each reel 180 has a flange 182 and a hub 184. A multiplicity of rectangular teeth 186 are formed at a constant pitch on the outer periphery of the flange 182.

An annular protrusion 194 having a rectangular cross-section is formed on the underside of the flange 182 concentrically with the flange 182. The outside diameter of the annular protrusion 194 is so determined that this protrusion 194 is loosely received in each of the through holes 46, 46 formed in the lower cassette case 10. An annular protrusion 196 having a rectangular cross-section is formed on the lower side of each reel flange 182 so as to concentrically surround the annular protrusion 194.

The arrangement is such that, as shown in FIGS. 1A and 2, a clamp 204 is adapted to fit in a notch formed in the hub 184 so as to fix one end of the cleaning tape 222 to the reel 180.

Figures 1B, 1C, 1D:
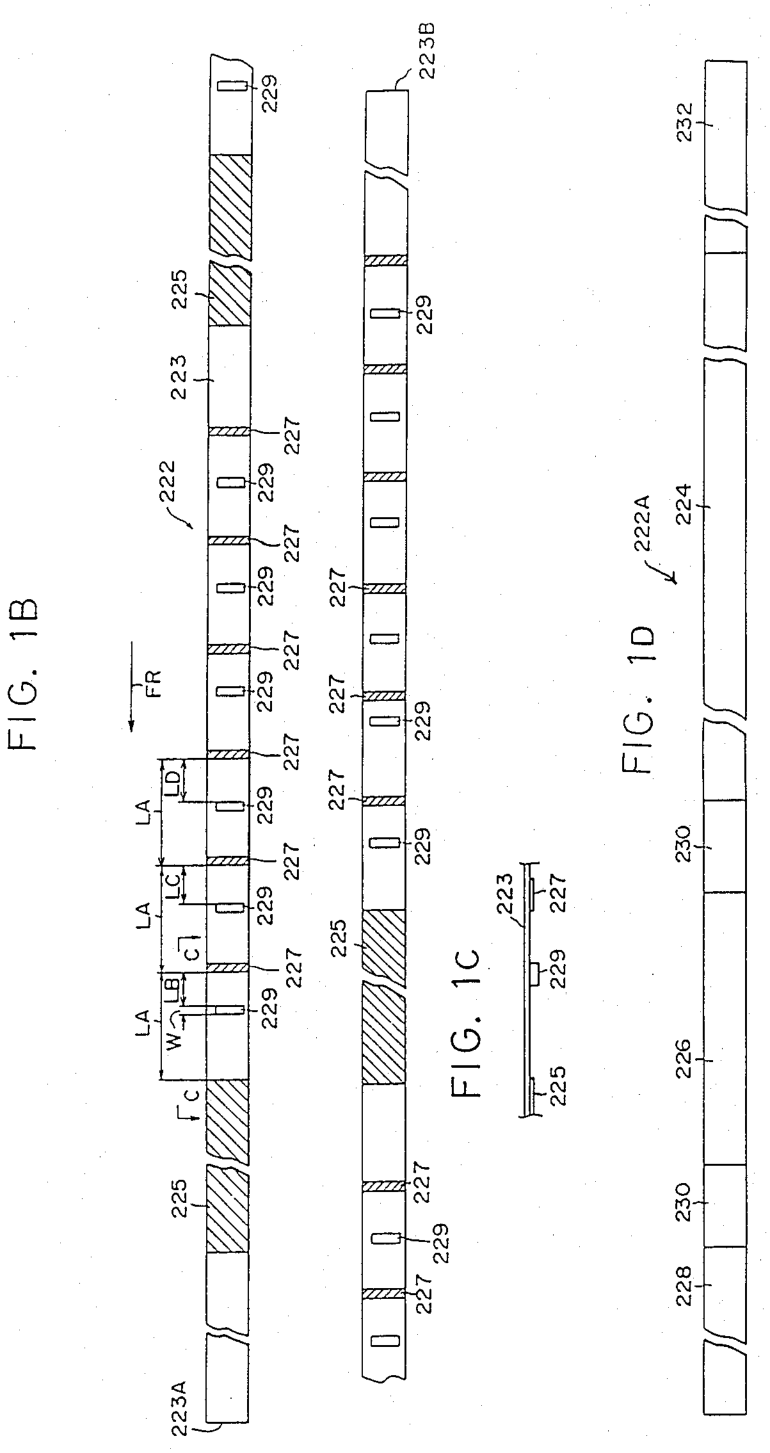
FIG. 1B is a front elevational view of the cleaning tape cassette with an intermediate portion of the tape being removed.
FIG. 1C is an end view of the cleaning cassette as viewed in the direction of arrows 1C—1C of FIG. 1B.
FIG. 1D is a front elevational view of an electrophotographic film which is used in place of a cleaning tape.

As will be best seen from FIG. 1B, the cleaning tape 222 accommodated in the cassette case has a cassette extraction mark 225 which is spaced by a predetermined distance from one end 223A of the base film 223 of the tape. Similar cassette extraction marks 225 are formed at a predetermined interval starting from this cassette extraction mark 225. A plurality of detection marks 227 are provided on the side of each cassette extraction mark 225 at a predetermined distance which is represented by LA. In the illustrated case, there are six detection marks 227 on the side of each cassette extraction mark 225 adjacent to the other end 223B of the base film 223.

A piece of adhesive tape 229 is provided on the side of each detection mark 227 adjacent to the first-mentioned end 223A of the base film 223. An adhesive is applied to the surface of each piece of adhesive tape. The pieces 229 of adhesive tape between two adjacent extraction marks 225, 225 are used in each cycle of cleaning operation. In the illustrated embodiment, six pieces of adhesive tape are used in a single cleaning cycle, for cleaning twice each of three sections assumed on the developing electrode 596 mentioned before. The number of sections assumed on the electrode 596 and the number of cleaning operations effected on each section in each cleaning cycle are only illustrative and may be varied as desired.

The cleaning tape 222 is initially wound from the other end 223B of the base film 223 around one of the reels 180 in the cleaning cassette 525 and is progressively fed towards the above-mentioned one end 223A, i.e., in the direction of an arrow FR in FIG. 1B.

The base film 223 constitutes an elongated base member which is an essential feature in the method and the cleaning cassette in accordance with the present invention. In this embodiment, the base film 223 is made of polyethylene terephthalate (PET) film of 50 μm thick. The surface of the base film 223 opposite to the surface carrying the pieces 229 of adhesive tape are coated with silicone so as to prevent sticking of the pieces 229 of adhesive tape when the base film is wound in the form of a roll. The material and the color of the base film 223 are so selected that the base film permits the blip detection light to be transmitted to the blip sensor 696 on the process head 554.

In contrast, the cassette extraction mark 225 and the detection mark 227 are located at positions corresponding to the position of the blip sensor 696 and are colored such that they do not allow the detection light to be transmitted to the blip sensor 696. For instance, each of the cassette extraction marks 225 and the detection marks 227 are formed by adhering, over the entire width of the base film 223, pieces of thin foils or tapes with an evaporation-deposited metal layer. Alternatively, the marks 225 and 227 may be formed by printing.

Thus, the described embodiment makes use of a tape having opaque portions constituting the cassette extraction marks 225. This, however, is not exclusive and the cassette extraction marks 225 may be formed by any desired type of mark provided that it can be detected by the sensor. For instance, these marks may be made transparent while other portions of the tape are made opaque.

Each of the pieces 229 of adhesive tape on the base film 223 projects from the plane of the base film 223. As will be seen from FIG. 12, the projection height of the adhesive tape piece 229 is 1.1 or more times greater than the height H of the step between the mask 590 and the developing electrode 596. The adhesive tape piece 229, however, does not contact the process head 554 during feeding of the cleaning tape 222 when the cleaning tape 222 is not pressed by the pressing plate 698. Thus, the adhesive tape piece 229 does not contact the developing electrode surface 596 which is recessed from the surface of the mask 590, during running of the cleaning tape 222. However, when the cleaning tape 222 is pressed by the pressing plate 698, the adhesive tape piece 229 can be brought into contact with the surface of the developing electrode 596 without fail. When an electrophotographic film 222A is set for the purpose of recording or play back in place of the cleaning tape 222, the pressing plate 698 serves to suitably press the electrophotographic film onto the process head 554.

The length of each adhesive tape piece 229, i.e., the width of the cleaning tape 222, is determined to be greater than the vertical height of the developing electrode 596 shown in FIG. 9 so that the adhesive tape piece 229 can make contact with the developing electrode 596 over the entire length or vertical height of the developing electrode 596. It is to be noted, however, both ends of each adhesive tape piece 229 are spaced from the adjacent widthwise ends or longitudinal edges of the base film 223 so that the adhesive tape pieces 229 are not detected by the blip sensor 696.

In the illustrated embodiment, the adhesive tape pieces 229 are formed by cutting a double-sided adhesive tape into narrow strips. The double-sided adhesive tape exhibits a greater adhesive force at its side contacting with the base film 223 that at its side contactable with the developing electrode, so that there is no risk for the adhesive tape piece 229 to come off the base film 223 due to sticking to the developing electrode 596 even when pressed onto the developing electrode 596. Preferably, the adhesive tape piece 229 has an elasticity in the direction of thickness thereof, so that the it can contact the whole portion of the solidified developer deposited on the developing electrode 596 even when the thickness of deposition is not uniform, because the elasticity of the adhesive tape piece 229 effectively absorbs any thickness irregularity of the solidified developer on the developing electrode. Practically, the adhesive tape piece 229 may be made from a rubber sheet or a foamed rubber sheet which exhibits a deformation in amount of not smaller than 5% when pressed by a pressure of 2 $kg/cm^2$. In the illustrated embodiment, the adhesive tape piece 229 is made from a sheet of foamed urethane of 0.6 mm thick which exhibits a deformation of about 20% when pressed with a pressure of 1.4 $kg/cm^2$. Needless to say, the adhesive used on the adhesive tape piece 229 should be selected so as not to cause any unfavorable effect on the electrophotographic film 222A.

As will be seen from FIG. 1B, each of six adhesive tape pieces 229 on the trailing side, i.e., the side counter to the arrow FR, of each cassette extraction mark 225 is spaced a predetermined distance from the associated detection mark 227 which is located on the trailing side of each adhesive tape piece 229. The distance between the first adhesive tape piece 229 after each cassette extraction mark 225 and the associated detection mark 227 is represented by LB. The distance between the second adhesive tape piece 229 from the detection mark 227 is represented by LC. The distance between the third adhesive tape piece 229 and the associated detection mark is represented by LD. The same distances LB, LC and LD are left between the fourth, fifth and sixth adhesive tape pieces 229 and the associated detection marks 227.

Referring now to FIG. 12, the width W of each adhesive tape piece 229 is not smaller than $\frac{1}{3}$ (one third) that of the horizontal breadth of the developing electrode 596. In the state shown in FIG. 12, the cleaning tape 22 is stationed while being pressed by the pressing plate 698 in response to the detection of the first detection mark 227 by the blip sensor 696. The leading end of the adhesive tape piece 229, i.e., the end in the direction of the arrow FR, is positioned beyond the outer end (right end as viewed in FIG. 12). As the cleaning tape is released from the pressing plate 698 in this state, the cleaning tape is fed until the second detection mark 227 is detected by the blip sensor 696. The cleaning tape is then stopped and pressed. In this state, the adhesive tape piece 229 spaced from the second detection mark 227 by the distance LC is positioned substantially at the mid portion of the developing electrode 596 indicated by W2. Similarly, when the third detection mark 227 is detected by the blip sensor 696, the third adhesive tape piece 229 is disposed at a position corresponding to the left end portion of the developing electrode 596 indicated by an arrow W3. Thus, the regions where the successive adhesive tape pieces 229 are stopped are partially overlapped in the horizontal direction.

As the three successive adhesive tape pieces 229 are brought into contact with the surface of the developing electrode 596, the removal of developer by adhesion is conducted over the entire surface of the developing electrode 596, as will be understood from the foregoing description. During the three successive cleaning operations performed by three successive adhesion tape pieces 229, regions corresponding to the difference between the lengths LB and LC and the difference between the lengths LC and LD shown in FIG. 1B are cleaned in an overlapped manner.

The fourth, fifth and the sixth adhesive tape pieces as measured from the cassette extraction mark 225 shown in FIG. 1B are stopped at positions corresponding to positions where the first, second and third adhesive tape pieces were stopped, so as to effect the cleaning by removal of any remaining part of the solidified developer. Thus, each of three regions assumed on the surface of the developing electrode 596 is cleaned twice, i.e., a pair of adhesive tape pieces 229 are applied to each of these three regions so as to ensure complete removal of matter deposited to or accumulated on the developing electrode 596.

In the described embodiment, the distance between the adhesive tape piece 229 and the detection mark 227 is so varied that the successive adhesive tape pieces 229 are placed on different regions on the surface of the developing electrode 596. This, however, is not exclusive and the difference between the adhesive tape piece 229 and the detection mark 227 may be constant provided that a suitable control is conducted for varying the length of time between the detection of each detection mark 227 and the stopping of each adhesive tape piece, i.e., the stopping of feed of the cleaning tape 222, so as to allow the successive adhesive tape sections 229 to cover different regions on the surface of the developing electrode 596, thus attaining the same effect as that brought about by the cleaning tape 222 shown in FIG. 1B.

FIG. 1D shows an electrophotographic film 222A for video recording. This electrophotographic film 22A may be wound around the reel 180 within the cleaning cassette 25 instead of the cleaning tape 222. The electrophotographic film 222A has a sensitive tape 224, a magnetic tape 226 as a memory tape and a leader tape 228 which are connected through splicing tapes 230. A conductive adhesive tape 232 is adhered to the end of the sensitive tape 224 opposite to the spliced end of the same.

The sensitive tape 224 is a tape-like electrophotographic film having a laminated structure composed of a transparent insulating substrate such as of polyester, a conductive layer such as of aluminum and a photoconductive insulating layer such as of polyvinyl carbasole which are laid one on another in the mentioned order. The conductive adhesive tape 232 is composed of a thin metallic tape in which is formed an adhesive layer with dispersion of conductive particles such as carbon particles.

In order to connect the conductive adhesion tape 232 to the sensitive tape 224, the photoconductive insulating layer of the photosensitive tape 224 is partly delaminated so as to expose the conductive layer and the conductive adhesion tape 232 is adhered to the exposed conductive layer.

The lower cassette case 10 and the upper cassette case 104 are joined to each other with the reels 180 placed such that the annular protrusions 196 on the reels are received in the annular recesses between the annular protrusions 28 and 50 on both side portions of the cassette. Both ends of the cleaning tape 222 are secured to the respective reels 180 by means of clamps 204. The reel 180 to which the aforementioned other end 223B is secured is reversed so that the cleaning tape 222 is fully wound on this reel 180. In this state, the cleaning tape 222 is wound around the guide rollers 236 and the straight portion of the cleaning tape 222 between these guide rollers 236 is exposed to the outside of the cleaning cassette 525 as shown in FIG. 3. In this state, the brake levers 262, 274 engage with the teeth 186 on the reels 180 so that the reels 180 are prevented from rotating and, hence, any unintentional slack of the cleaning tape 222 is avoided. In addition, the guard panel 322 covers the exposed portion of the cleaning tape 222 so as to prevent the adhesive tape pieces 229 from accidentally contacting other portions of the apparatus.

The brake lever 262 is pivotally supported in the brake lever chamber 64 and has a reel engaging portion 266 and a release piece engaging portion 268 which are formed integrally from a synthetic resin. The release piece engaging portion 268 has an end disposed in the brake mechanism chamber 38. The other brake lever 274 has a configuration and arrangement which are in symmetry with those of the brake lever 262. Torsion coiled springs 276 and 274 are attached to the brake levers 262 and 274 so that the brake levers are urged by these springs such that reel engaging pieces 266 and 266 are projected into the left and right reel chambers 30 and 32 so as to engage with the teeth 186 on the peripheries of the flanges of the reels 180, 180.

A release piece 278 as the brake releasing member is received in the release piece chamber 62 and is adapted to move the brake levers 262, 274 out of engagement with the reels 180 when operated by an external force.

Referring back to FIG. 1, a lock plate 292 serving as means for locking the guard panel is pivotally supported in the lock plate chamber 40. The lock plate 292 has a guard panel retaining portion 296 projected from one end and a leaf spring portion 298 projected from the other end. These portions are formed as a unit with each other from a synthetic resin.

As will be seen from FIG. 3, the leaf spring portion 298 of the the lock plate 292 resiliently contacts at its left end with the inner surface of the left side wall 16, so as to urge the guard panel retaining portion 296 clockwise, whereby the end of the guard panel retaining portion 296 projects to oppose to the guard panel 322.

As shown in FIG. 1A, reel pressing springs 304 and 310 are formed by flat sheets of a metal processed by bending and shearing. These reel pressing springs 304 and 310 are secured to the upper cassette case 104 and urge the respective reels 180 toward the lower cassette case 10. When a video recording film 222A is loaded in the cleaning cassette 525 in place of the cleaning tape 222, these reel pressing springs serve as grounding conductive members which electrically ground the video recording film 232A.

Figure 5:
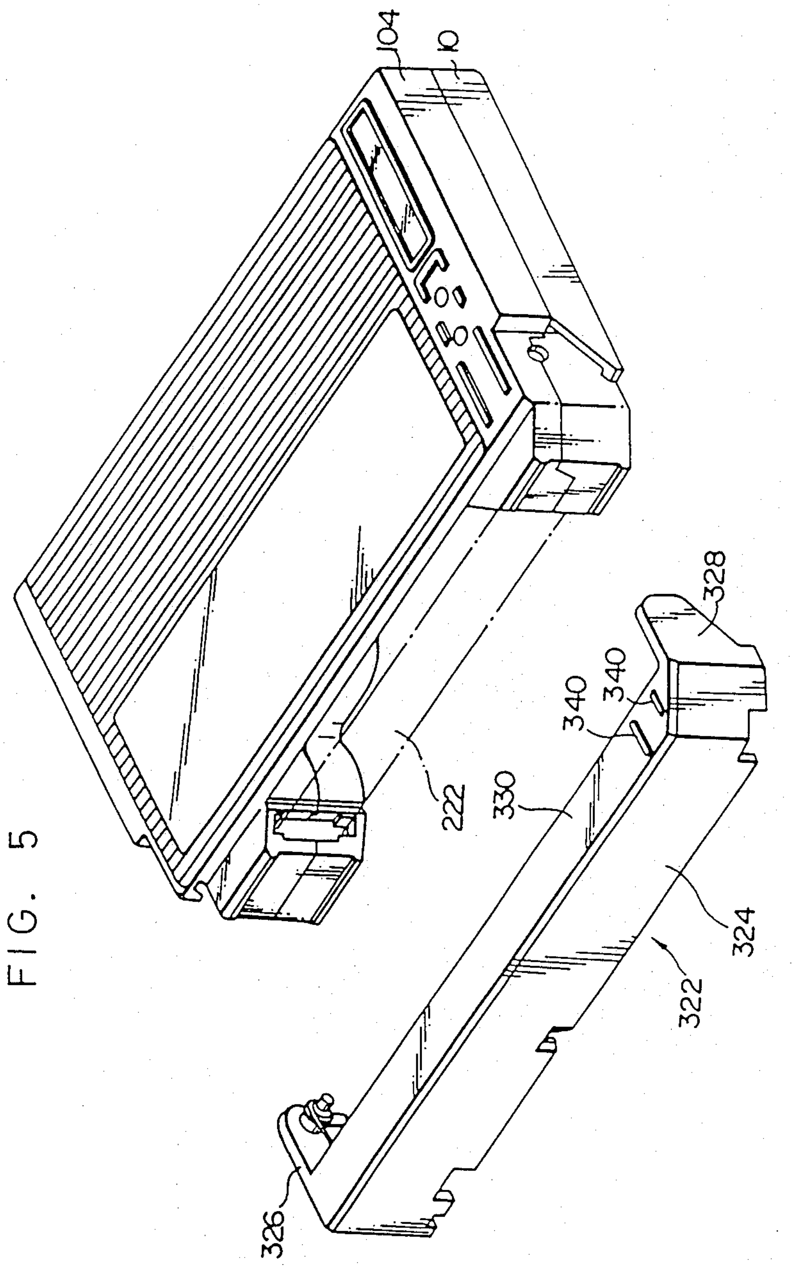
FIG. 5 is an exploded perspective view showing the relationship between the cassette and a guard panel.

As shown in FIGS. 1A and 5, the guard panel 322 which serves as a closure of the cassette case body 320 has a front wall 324, left and right side walls 326, 327 and a top wall 330, and is pivotally secured to the cassette case body 320. The guard panel 322 is rotationally biased in such a direction as to cover the portion of the cleaning tape 222 exposed on the front side of the cassette case body 320. The lock plate locks the guard panel in this state.

FIG. 6 schematically shows the construction of a cassette holder 348 as a device for loading the cleaning cassette in accordance with the present invention. The cassette holder 348 is liftably supported by means of a lifting gear 350 of link type. The cassette holder 348 has a pair of contact springs 352, 354 which extend inwardly and downwardly from the cassette receiving end in parallel with each other. The direction of insertion of the contact springs 352, 354 is indicated by an arrow A. When an electrophotographic film 222 is loaded in the cleaning cassette in place of the cleaning tape, these contact springs 352, 354 supply electric power to the electrophotographic film through the reel pressing springs 310 and contact pieces 212.

A pressing block 356 is disposed in an aperture formed in one side wall of the cassette holder 348. The pressing block 356 is fixed to one end of the leaf spring 358 and has an end projecting from the aperture so as to press the lock plate 292 projecting from the cassette thereby opening the guard panel 322.

The cassette holder 348 has a detection pin 382 for detecting that the cassette held by the cassette holder 348 is a cleaning cassette. The detection pin 382 is biased upward by a spring. When the cassette on the cassette holder is a cleaning cassette, the pin 382 is allowed to move upward into the cassette detection hole 103A formed in the bottom plate 12 of the cleaning cassette 525. The movement of this pin 382 is detected by a limit switch, so that a discrimination as to whether the cassette held by the cassette holder is a cleaning cassette or a video recording cassette, by judging the output from the limit switch 384.

The video recording cassette and the cassette loading device is provided with cassette loading detection means (not shown) capable of detecting loading of a cassette, and an erasion prevention mechanism (not shown) which prohibits, by removal of a specific claw on the cassette, rewriting the content of the memory in the cassette when the user wishes to maintain the content without erasion. Such means and mechanism can be used as means for detecting the presence or absence of the cleaning cassette, without using a detection pin specifically designed for the purpose of detection of the cleaning cassette.

To this end, an arrangement may be adopted in which, when the cassette on the cassette holder is a cleaning cassette, only the erasion prevention mechanism operates while the cassette loading detection means is kept inoperative. Thus, the following four states are discriminated by examining the states of the erasion prevention mechanism and the cassette loading detection means. Namely, when both the cassette loading detection means and the erasion prevention mechanism are inoperative, it is judged that there is no cassette on the cassette holder. When the cassette loading detection means is operative while the erasion prevention mechanism is inoperative, it is judged that the cassette holder is holding a rewritable video recording cassette. When both the cassette loading detection means and the erasion prevention mechanism are inoperative, it is judged that the cassette holder is holding a video recording cassette which should not be erased. Finally, when the erasion prevention mechanism is operating while the cassette loading detection means is inoperative, it is judged that the cassette holder is holding a cleaning cassette.

Thus, the judgment concerning the states of the cassette loading detection means and the erasion prevention means enables the type of the cassette to be discriminated between the cleaning cassette and the image recording cassette. Control of various operating conditions of the electrophotographic apparatus, such as timing of operation of the pressing plate 698 and the timing of operation of the motor 394, are changed-over in accordance with the result of the discrimination.

When the cassette holder 348 is loaded with the cleaning cassette, the drive shafts 390 and 392 are received in the central holes of the reels 180 so that the reels are ready for operation by the driving torque of the motor 394. More specifically, the driving torque produced by the motor 394 is transmitted to either one or both of the reels 180 in a reversible manner through a clutch 395 and gears 396, 397. The driving torque of the motor 394 applies tension to the cleaning tape 222 so as to separate the adhesive tape piece 229 from the developing electrode 596. When an electrophotographic film 222A is used in place of the cleaning tape 222, needless to say, the driving torque of the motor 394 acts to track and feed the electrophotographic film 222A in the longitudinal direction of the film 222A.

For the purpose of cleaning the critical portion of the electrophotographic apparatus which is in this case the developing electrode, the cassette holder 348 is loaded with the cleaning cassette 525. Then, as an eject button (not shown) is operated, the cassette holder 348 is raised by a lifting gear 350. When the cleaning cassette 525 has been moved fully in the direction of the arrow A, the detection pin 382 is received in the cassette detection hole 103A formed in the underside of the cleaning cassette 525, so that the limit switch 384 detects that the cassette now set on the cassette holder is a cleaning cassette. Then, the cleaning operation for cleaning the developing section is commenced in response to the signal derived from the limit switch 384. In contrast, when the cassette which is now set on the cassette holder 348 is a video recording tape, the detection pin 382 does not move and, hence, the limit switch 384 does not operate because the cassette is devoid of the cassette detection hole which would receive the detection pin 382, whereby the presence of the video recording cassette is confirmed to start recording or playback operation.

In the cleaning cassette 525 of the described embodiment, the bottom of the isolated chamber 42 formed in the lower cassette case 10 is closed. This also enables the cassette to be confirmed as being a cleaning cassette. Any video recording tape cassette has a claw which is bent or removed when the user wishes that the content of the record be maintained without erasion. When such a claw exists, or when the removal of such a claw is detected, the cassette on the cassette holder is judged as being a video recording cassette.

When the cleaning cassette 525 has been fully inserted, the pressing block 356 drives the lock plate 292 so as to rotationally urge the guard panel retaining portion 296 against the biasing force of the leaf spring portion 298, whereby the guard panel 322 is released.

After the insertion of the cassette holder 348 by the cleaning cassette 525 is completed, the user presses the cassette holder 348 or the cassette is automatically retracted into the apparatus so as to be set on a predetermined portion of the apparatus. During this movement, the guard panel 322 is opened by a closure opening mechanism provided on a portion of the cassette holder 348, so as to expose the straight portion of the cleaning tape 222.

In this state, however, the cleaning tape 222 and the adhesive tape pieces 229 carried by the tape exposed in the region between the guide rollers 226 do not contact the process head 554.

During the retraction of the cassette holder into the operating position, particularly when the cassette holder 348 is still in the portion near the inlet end of the path of retraction, a brake release pin (not shown) is moved into the bottom plate 12 so that the brake levers 262 and 274 are rotated through the release piece 278 out of engagement with the teeth 186 of the reels 180, thus allowing the reels 180 to rotate as desired.

As shown in FIG. 4, the holes of reels 180 are made to fit around the drive shafts 390 and 392 in the beginning period of retraction of the cassette holder 348.

Then, as the driving torque of the motor 394 is transmitted to one of the reels 180 through the clutch 395, the cleaning tape 222 is moved in the direction of the arrow FR. The motor 394 is stopped when the detection mark 227 which is the first one as counted from the first cassette extraction mark 225 is detected by the blip sensor 696. In this state, however, the adhesive tape piece 229 is below the level shown in FIG. 12 so that it is still out of contact with the developing electrode 596, although it is placed in alignment with one horizontal end of the developing electrode 596 indicated by W1.

Simultaneously, the solenoid 734 shown in FIG. 11 is activated so as to cause the pressing pate 698 to press the cleaning tape 222 towards the process head 554. In consequence, the adhesive surface on the end of the adhesive tape piece 229 is pressed onto the surface of the developing electrode 596.

Then, the motor 394 is started again so that the cleaning tape 222 is fed in the direction of the arrow FR. When the motor 394 is re-started, the pressing force which has been exerted by the pressing plate 698 is released and, at the same time, the driving torque of the motor 394 is transmitted also to the other reel 180 in reversing direction, so as to take-up the cleaning tape 222 on both reels 180, thereby temporarily applying a tension to the cleaning tape 222. This tension causes the adhesive tape piece 229 to be forcibly separated from the surface of the developing electrode 596. In consequence, any portion of the developer which has been solidified and accumulated on the surface of the developing electrode 596 as a result of repetitional recording operation is removed from the electrode surface due to adhesion to the surface of the adhesive tape piece 229.

Figure 13A:
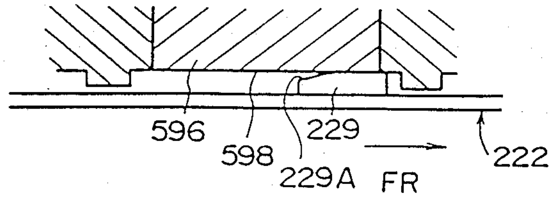
FIGS. 13A to 13F are sectional views corresponding to FIG. 12, illustrating different steps of cleaning operation.

In this case, by increasing the tape winding force acting in the direction of the arrow FR in FIG. 13A, the cleaning tape 222 is fed in the direction of the arrow FR. In this state, the adhesive tape piece 229 is pressed onto the developing electrode 596 with a greater force at its portion adjacent to the right corner as viewed in FIG. 13A of the developing chamber 598 which is recessed than at the portion closer to the other corner (left corner as viewed in FIG. 13A) so that a minute gap 229A is formed between the adhesive tape piece 229 and the surface of the developing agent 596 at the end portion of the adhesive tape piece 229 adjacent to the second-mentioned corner. By virtue of the increased pressing force, the solidified developer accumulated on the portion of the surface of the developing agent 596 adjacent to the corner which is on the right side as viewed in FIG. 13A is removed effectively.

During the movement of the cleaning tape 222 in the direction of the arrow FR, the adhesive tape piece 229 is moved in a slightly offset manner to the right as viewed in FIG. 13A, so that the solidified developer and other unnecessary matter accumulated on the corner of the recessed developing chamber 598 is removed.

A higher removing efficiency will be obtained when the developing electrode is in dry condition than when the same is in wet condition. It is therefore advisable to blow drying air to the developing electrode in advance of and, if necessary, even during feeding of the cleaning tape 222.

The application of tension to the cleaning tape 222 may be realized by driving one of the reels 180 in taking-up direction while braking the other reel 180. The temporary braking of one of the reels 180 will minimize unnecessary movement of the cleaning tape 222.

Figure 13B:
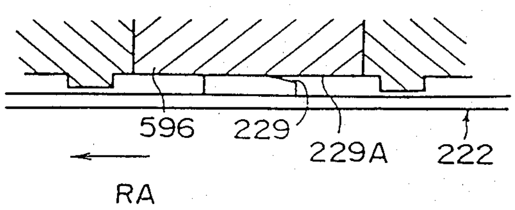

When the second detection mark 227 is detected by the blip sensor 696 as a result of movement of the cleaning tape 222, the motor 394 is stopped while the second adhesive tape piece 229 is placed at a position facing the region W2 shown in FIG. 12, as illustrated in FIG. 13B. The second adhesive tape piece 229 is then pressed onto the central region W2 of the surface of the developing electrode 596 as the pressing plate 698 is actuated. Then, the cleaning tape 222 is released from the pressing force which has been exerted by the pressing plate 698 and a tension is applied to the cleaning tape 222 so that the second adhesive tape piece 229 is forcibly separated from the surface of the developing electrode 596 thereby lifting solidified developer off the central region W2 of the surface of the developing electrode 596. In this case, however, the tension is applied by pulling the cleaning tape 222 in the direction counter to that shown in FIG. 13A, i.e., in the direction indicated by an arrow RA in FIG. 13B.

Figure 13C:
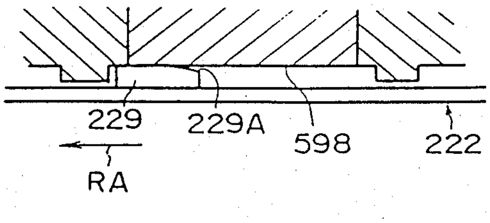

As a result of the feed of the cleaning tape 222 in the direction of the arrow RA, the third detection mark 227 is brought into alignment with the blip sensor 696 so as to be detected by the latter. As a result, the feed of the cleaning tape 222 is stopped at the position where the third adhesive tape piece 229 faces the third region W3, i.e., the other end portion of the surface of the developing electrode 596, as shown in FIG. 13C.

Then, the adhesive tape piece 229 is pressed onto the region W3 of the surface of the developing electrode 596 and then the cleaning tape 222 is tensed again by being pulled in the direction of the arrow RA, whereby the adhesive tape piece 229 is forcibly separated from the surface of the developing electrode. In this case, the adhesive tape piece 229 effectively removes the solidified developer accumulated in the region near the other corner, i.e., left corner as viewed in FIG. 13C, for the same reason as that explained before in connection with FIG. 13A.

Figure 13D:
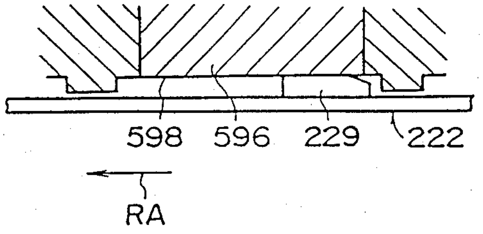
Figure 13E:
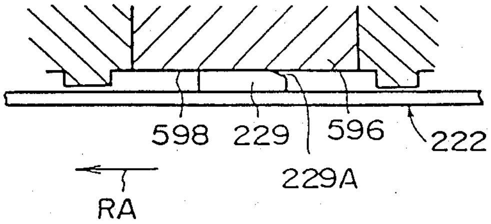
Figure 13F:
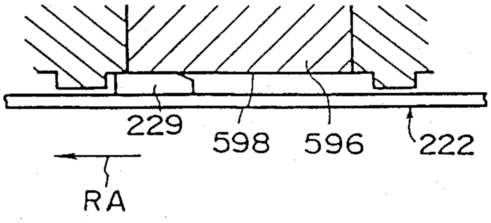

Then, the fourth to sixth adhesive tape pieces 229 are successively brought into contact with successive regions of the surface of the developing electrode 596 as shown in FIGS. 13D to 13F and are separated as the cleaning tape 222 is pulled in the direction of the arrow RA as shown in FIGS. 13D to 13F, whereby the solidified developer remaining on the surface of the developing electrode is removed completely. It is true that pulling of the cleaning tape in one direction tends to create a minute gap between the adhesive tape piece 229 and the surface of the developing electrode particularly at the end of the adhesive tape piece 229 on the trailing side. This minute gap undesirably impairs the effect of removing the solidified developer, often allowing a small amount of solidified developer to remain in such a minute gap. In the described embodiment, however, such portion of the solidified developer which has failed to be lifted off can be removed completely because the successive tapes 229 are pressed in a successively offset manner as described.

When the sixth adhesive tape piece 229 has been forcibly separated from the surface of the developing electrode, the cleaning tape 222 is fed and, when the second cassette extraction mark 225 is detected by the blip sensor 696, the power supply to the motor 394 is terminated to stop the feed of the cleaning tape 222. Then, the controller automatically opens the cassette holder 348 and informs that the cleaning operation has been finished.

Upon confirming the completion of the cleaning operation, the user takes the cleaning cassette 525 off the apparatus and sets a video recording cassette instead in the cassette holder, for the purpose of, for example, recording. It will be understood that the recording is conducted in such a manner as to ensure a high quality of the recorded image, by virtue of the cleaned state of the developing electrode.

After elapse of a predetermined recording time or repetition of a predetermined number of recording cycles, or periodically at a predetermined time interval, the cleaning cassette 525 is mounted again on the cassette holder 348 so as to start again the cleaning of the developing electrode 596.

As has been described, according to the invention, a plurality of adhesive tape pieces 229 are pressed onto different regions of the surface of the object to be cleaned, so that the cleaning can be conducted over a wide area. Since each adhesive tape piece has a small area, only a light load is applied to the motor when the motor produces tension in the cleaning tape for the purpose of separation of the adhesive tape piece from the object surface. In general, the driving motor for driving a video recording cassette in electrophotographic apparatus is not designed to produce large driving torque. The light load required for the separation of the adhesive tape piece from the object surface is sufficiently borne even by such a driving motor having a small output torque.

Although the invention has been described through a specific embodiment applied to cleaning of the developing process head for processing an electrophotographic film, this is only illustrative and the invention can be applied broadly to cleaning of various objects or devices having recessed portions similar to the developing section in the electrophotographic apparatus specifically mentioned in the foregoing description.

What is claimed is:

1. A cleaning method for removing, by adhesion, unnecessary matter accumulating on the surface of an object to be cleaned on the bottom of a recess thereby cleaning said surface of said object, comprising the steps of:

(a) bringing an adhesive surface on the end of a projection projecting from the surface of an elongated base member into contact with said matter to be removed on the surface to be cleaned; and (b) applying a tension to said base member so as to forcibly separate said adhesive surface from said surface to be cleaned with said unnecessary matter adhering to said adhesive surface, thereby removing said unnecessary matter from said surface to be cleaned.

2. A cleaning method according to claim 1, wherein said step (a) is carried out by placing said elongated base member in alignment with said surface to be cleaned and then pressing said elongated base member in the direction in which said projection projects.

3. A cleaning method according to claim 2, wherein, when one of two corners of said recess is cleaned, said tension applied to said base member in said step (b) is applied in such a direction that said adhesive surface is moved away from the other of two corners of said recess.

4. A cleaning method according to claim 2, wherein said tension applied to said elongated base member in said step (b) is generated by pulling said elongated base member in the longitudinal direction thereof.

5. A cleaning method according to claim 4, wherein said elongated base member is taken-up and wound at its both ends on respective reels and said tension applied to said elongated base member is produced by winding torque of at least one of said reels.

6. A cleaning method according to claim 2, wherein said elongated base member has a plurality of adhesive means arranged at a predetermined pitch in the longitudinal direction of said elongated base member and fixed to said elongated base member, each of said adhesive means presenting said adhesive surface, said adhesive means being adapted to be successively brought into alignment with the surface to be cleaned as a result of movement of said elongated base member and said steps (a) and (b) are executed on each of the successive adhesive means.

7. A cleaning method according to claim 6, wherein said movement of said elongated base member is so controlled that the successive adhesive means are brought into regions of said surface to be cleaned which are offset by a predetermined amount in the longitudinal direction of said elongated base member.

8. A cleaning method according to claim 7, wherein, when one of two corners of said recess in cleaned, said tension applied to said base member in said step (b) is applied in such a direction that said adhesive surface is moved away form the other of two corners of said recess.

9. A cleaning cassette for removing, by adhesion, unnecessary matter accumulating on the surface of an object to be cleaned on the bottom of a recess thereby cleaning said surface of said object, comprising:

a cassette case;

a pair of reels rotatably mounted in said cassette case;

a tape-type elongated base member having both ends retained by said reels; and at least one projection projecting from a surface of said elongated base member and having an adhesive end surface, wherein said adhesive end surface is brought into contact with said surface to be cleaned to thereby remove said unnecessary matter.

10. A cleaning cassette according to claim 9, wherein the projection height of said projection is at least 1.1 times as large as the depth of said recess.

11. A cleaning cassette according to claim 10, wherein a plurality of said projections each having said adhesive surface are provided on said elongated base member at a predetermined pitch in the longitudinal direction of said elongated base member.

12. A cleaning cassette according to claim 11, wherein the size of said adhesive surface in the direction of width of said elongated base member is greater than the size of said surface to be cleaned as measured in the same direction.

13. A cleaning cassette according to claim 11, wherein said elongated base member is provided with a plurality of cassette extraction marks arranged at a predetermined pitch in the longitudinal direction of said elongated base member, each of said cassette extraction marks being adapted to inform the user of the completion of one cycle of cleaning operation, and wherein at least one projection having said adhesive surface is provided between two adjacent cassette extraction marks.

14. A cleaning cassette according to claim 13, wherein two or more said projections each having said adhesive surface are disposed between two adjacent cassette extraction marks and the total length of said adhesive surfaces as measured in the longitudinal direction of said elongated base member is greater than the size of said surface to be cleaned as measured in the same direction.

15. A cleaning cassette according to claim 11, wherein the projection height of said projection is at least 1:1 times as large as the depth of said recess.

16. A cleaning cassette according to claim 15, wherein said projections are composed of pieces of double-sided adhesive tape adhered to said elongated base member.

17. A cleaning cassette for removing, by adhesion, unnecessary matter accumulating on the surface of an object to be cleaned on the bottom of a recess thereby cleaning said surface of said object, comprising:

a cassette case;

a pair of reels rotatably mounted in said cassette case;

a tape-type elongated base member having both ends retained by said reels;

a plurality of projections provided on said elongated base member and arranged at a predetermined pitch in the longitudinal direction of said elongated base member; and adhesive portions provided on the surfaces of said projections, wherein said adhesive portions are brought into contact with said surface to be cleaned to thereby remove said unnecessary matter.

18. A cleaning cassette according to claim 17, wherein the projection height of said projection is at least 1.1 times as large as the depth of said recess.

19. A cleaning cassette according to claim 18, wherein each of said projections is made from an elastic material.

20. A cleaning cassette according to claim 19, wherein said object to be cleaned is a developing electrode and said recess is formed in the developing section of a process head for processing an electrophotographic film.

* * * * *